(12) United States Patent
Hayashi et al.

(10) Patent No.: US 9,436,430 B2
(45) Date of Patent: Sep. 6, 2016

(54) AUDIO OUTPUT CONTROL DEVICE

(71) Applicant: DENSO CORPORATION, Kariya, Aichi-pref. (JP)

(72) Inventors: Yuuichi Hayashi, Kariya (JP); Shigeo Kato, Kariya (JP); Hitoshi Sugiyama, Anjo (JP); Yoshihiro Ueda, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/761,630

(22) PCT Filed: Nov. 5, 2013

(86) PCT No.: PCT/JP2013/006518
§ 371 (c)(1),
(2) Date: Jul. 17, 2015

(87) PCT Pub. No.: WO2014/111988
PCT Pub. Date: Jul. 24, 2014

(65) Prior Publication Data
US 2015/0363155 A1    Dec. 17, 2015

(30) Foreign Application Priority Data

Jan. 18, 2013   (JP) .................................. 2013-007481

(51) Int. Cl.
*G06F 17/00*   (2006.01)
*G06F 3/16*    (2006.01)
(Continued)

(52) U.S. Cl.
CPC .............. *G06F 3/16* (2013.01); *G01C 21/3629* (2013.01); *G01C 21/3655* (2013.01); *G10L 13/02* (2013.01); *G06F 3/167* (2013.01); *G10L 13/043* (2013.01)

(58) Field of Classification Search
CPC ............ G01C 21/365; G01C 21/3629; G01C 21/3655; G06F 3/16; G06F 3/162; G06F 3/165; G06F 3/167
See application file for complete search history.

(56) References Cited

U.S. PATENT DOCUMENTS

| 6,208,932 B1* | 3/2001 | Ohmura ............... G01C 21/365 340/988 |
| 2005/0143915 A1* | 6/2005 | Odagawa ............. G08G 1/0962 701/443 |

(Continued)

FOREIGN PATENT DOCUMENTS

| EP | 2669236 A1 | 12/2013 |
| JP | H10104003 A | 4/1998 |

(Continued)

OTHER PUBLICATIONS

International Search Report and Written Opinion (in Japanese with English Translation) for PCT/JP2013/006518, mailed Dec. 24, 2013; ISA/JP.

*Primary Examiner* — Andrew C Flanders
(74) *Attorney, Agent, or Firm* — Harness, Dickey & Pierce, P.L.C.

(57) ABSTRACT

An audio output control device includes a control device that adjusts an output of earlier audio information and an output of later audio information in a situation where a request for outputting the later audio information is made before the output of the earlier audio information ends. The control device includes: a first acquisition device that acquires end time information of the earlier audio information; a second acquisition device that acquires delay permissible information of the later audio information; and a first determination device that determines whether a wait for outputting the later audio information is available, according to the end time information and the delay permissible information. When the wait is available, the control device outputs the later audio information after preferentially executing the output of the earlier audio information.

4 Claims, 7 Drawing Sheets

(51) Int. Cl.
*G10L 13/02* (2013.01)
*G01C 21/36* (2006.01)
*G10L 13/04* (2013.01)

(56) References Cited

U.S. PATENT DOCUMENTS

| | | | |
|---|---|---|---|
| 2008/0032663 A1* | 2/2008 | Doyle | H04H 20/106 |
| | | | 455/345 |
| 2011/0137437 A1* | 6/2011 | Jonsson | G01C 21/20 |
| | | | 700/94 |
| 2011/0179374 A1 | 7/2011 | Yagi et al. | |
| 2013/0322634 A1* | 12/2013 | Bennett | G10L 21/00 |
| | | | 381/17 |
| 2015/0032364 A1* | 1/2015 | Yamaguchi | G01C 21/3629 |
| | | | 701/400 |
| 2015/0194165 A1* | 7/2015 | Faaborg | G10L 21/00 |
| | | | 704/270.1 |

FOREIGN PATENT DOCUMENTS

| | | |
|---|---|---|
| JP | 2006267328 A | 10/2006 |
| JP | 2007212574 A | 8/2007 |
| JP | 2009058236 A | 3/2009 |
| JP | 2011150489 A | 8/2011 |
| JP | 2012133575 A | 7/2012 |
| JP | 2012168243 A | 9/2012 |
| WO | WO-2012101768 A1 | 8/2012 |

\* cited by examiner

FIG. 2A

```
CONTENT (OUTPUT REQUEST)

·DELAYABLE PERIOD
·CONTENT LENGTH
·SIGNIFICANT
  INFORMATION END TIME
·INTERRUPTIBLE TIME
·LIFE
·CATEGORY

·ACTIVE STATE
```

FIG. 2B

| CATEGORY | VALUE (PRIORITY) |
|---|---|
| CATEGORY 1 | 10 |
| CATEGORY 2 | 9 |
| CATEGORY 3 | 8 |
| CATEGORY 4 | 7 |

(a) BEFORE ARBITRATION (b) EVALUATE VALUE OF AUDIO INFORMATION (c) AFTER ARBITRATION (a) BEFORE ARBITRATION (b) A CASE WHERE OUTPUT OF AUDIO INFORMATION A IS INTERRUPTED, AND AUDIO INFORMATION B IS OUTPUT BY INTERRUPT

AUDIO OUTPUT CONTROL DEVICE

CROSS REFERENCE TO RELATED APPLICATIONS

This application is a U.S. National Phase Application under 35 U.S.C. 371 of International Application No. PCT/JP2013/006518 filed on Nov. 5, 2013 and published in Japanese as WO 2014/111988 A1 on Jul. 24, 2014. This application is based on and claims the benefit of priority from Japanese Patent Application No. 2013-007481 filed on Jan. 18, 2013. The entire disclosures of all of the above applications are incorporated herein by reference.

TECHNICAL FIELD

The present disclosure relates to an audio output control device that adjusts audio outputs when plural types of the audio outputs are present at the same time.

BACKGROUND ART

In an audio output interface mounted in a vehicle or the like, when plural pieces of audio information become output candidates at the same time, the audio outputs are arbitrated to restrict an output target. For example, in the prior art disclosed in PTL 1, the audio outputs are arbitrated in the following manner.

An arbitration table is created, and the arbitration table is implemented in software of a navigation system in advance. The arbitration table defines the priorities of the audio outputs to be arbitrated. When plural pieces of the audio information to be output in the navigation system are present at the same time, the audio information higher in order is preferentially output according to priorities based on the arbitration table.

The above prior art suffers from the following problems. The audio information has temporal characteristics that require a fixed period of time since the output starts until significant contents are transferred. For that reason, when the output of the audio information is interrupted on the way, necessary information may not be transmitted to a user. In the arbitration table in the prior art, the temporal characteristics of the audio information are not taken into consideration.

For example, in a situation where a request for outputting later audio information higher in priority is made while earlier audio information is being output, the output of the earlier audio information may be interrupted to output the later audio information by interruption as a result of the output arbitration based on the arbitration table. It is assumed to define "When an output A and an output B come together, the output B has priority, and the output A is implemented after the output B has ended." in the arbitration table. According to that definition, when an event of the latter output B occurs just before the earlier output A ends, even if the output A leaves only slight wording of an end of a sentence, the output A is interrupted, and the remaining of the output A is output after the output B has been completed. In that case, the start of the output B has only to be slightly delayed, but the prior art does not take the temporal characteristics of the audio information into consideration, as a result of which wording meaningless to the user would be output later.

Alternatively, when the later audio information is interrupted before the significant contents in the earlier audio information are completely transmitted, the later audio information may sound like unnatural audio information not meaningful to the user. When the plural audio outputs are arbitrated without taking the temporal characteristics of the audio information into consideration, the interrupt of the audio outputs is likely to occur at unnatural timing for the user.

PRIOR ART LITERATURES

Patent Literature

Patent Literature 1: JP-H10-104003

SUMMARY OF INVENTION

It is an object of the present disclosure to provide an audio output control device for adjusting audio outputs taking temporal characteristics of audio information into consideration.

According to an aspect of the present disclosure, an audio output control device that outputs audio information from an audio output device according to an output request output from each of a plurality of output request devices for requesting an output of the audio information, includes: a control device that adjusts an output of earlier audio information and an output of later audio information in a situation where a request for outputting the later audio information is made before the output of the earlier audio information ends. The control device includes: a first acquisition device that acquires end time information related to an estimated time of the output of the earlier audio information, at which transmission of a significant content of the earlier audio information is completed; a second acquisition device that acquires delay permissible information related to a permissible time of a delay from time when the request for outputting the later audio information is made until the output of the later audio information starts; and a first determination device that determines whether a wait for outputting the later audio information is available, according to a temporal relationship between the end time information acquired by the first acquisition device and the delay permissible information acquired by the second acquisition device. The control device waits for outputting the later audio information, and outputs the later audio information after preferentially executing the output of the earlier audio information, under a condition that it is determined that the wait by the first determination device is available.

In the above audio output control device, the audio outputs can be arbitrated taking into consideration the temporal characteristics of the audio information such as the estimated time at which the significant contents of the audio information has been transmitted, or the tolerance time of the delay until the output of the audio information starts. For example, if the output of the later audio information can be respited until the significant contents of the earlier audio information have been transmitted, collided output requests can be arbitrated in a mode where interrupt is not made for the output of the earlier audio information. As described above, the temporal characteristics not taken into consideration in the prior art are employed for arbitration of the audio outputs. As a result, as compared with a case in which the arbitration is performed by only the definition of the priority, the schedule of the outputs of the audio information can be adjusted in a more flexible mode.

As a result of the arbitration based on the temporal characteristics of the audio information, when the output of the later audio information is determined as wait disable, the following matter is considerable. In other words, the control device further includes a comparison device that compares an information value defined in the earlier audio information in advance with an information value defined in the later audio information in advance. The control device outputs the audio information higher in the information value preferentially as a result of the comparison in the comparison device under a condition where the output is determined as the wait disable by the first determination device. With the above configuration, the schedule of the outputs of the audio information can be adjusted in a mode where both of the temporal characteristics of the audio information and the information value of the audio information are taken into consideration.

BRIEF DESCRIPTION OF DRAWINGS

The above and other objects, features and advantages of the present disclosure will become more apparent from the following detailed description made with reference to the accompanying drawings. In the drawings:

FIG. 2A is an illustrative view illustrating a configuration of content;

FIG. 2B is an illustrative view illustrating values of respective categories of the content;

EMBODIMENTS FOR CARRYING OUT INVENTION

Hereinafter, an embodiment of the present disclosure will be described with reference to the drawings. Meanwhile, the present disclosure is not limited to the following embodiment, but can be implemented in various aspects.

[Description of Configuration of Audio Output Control Device 1]

Figure 1:
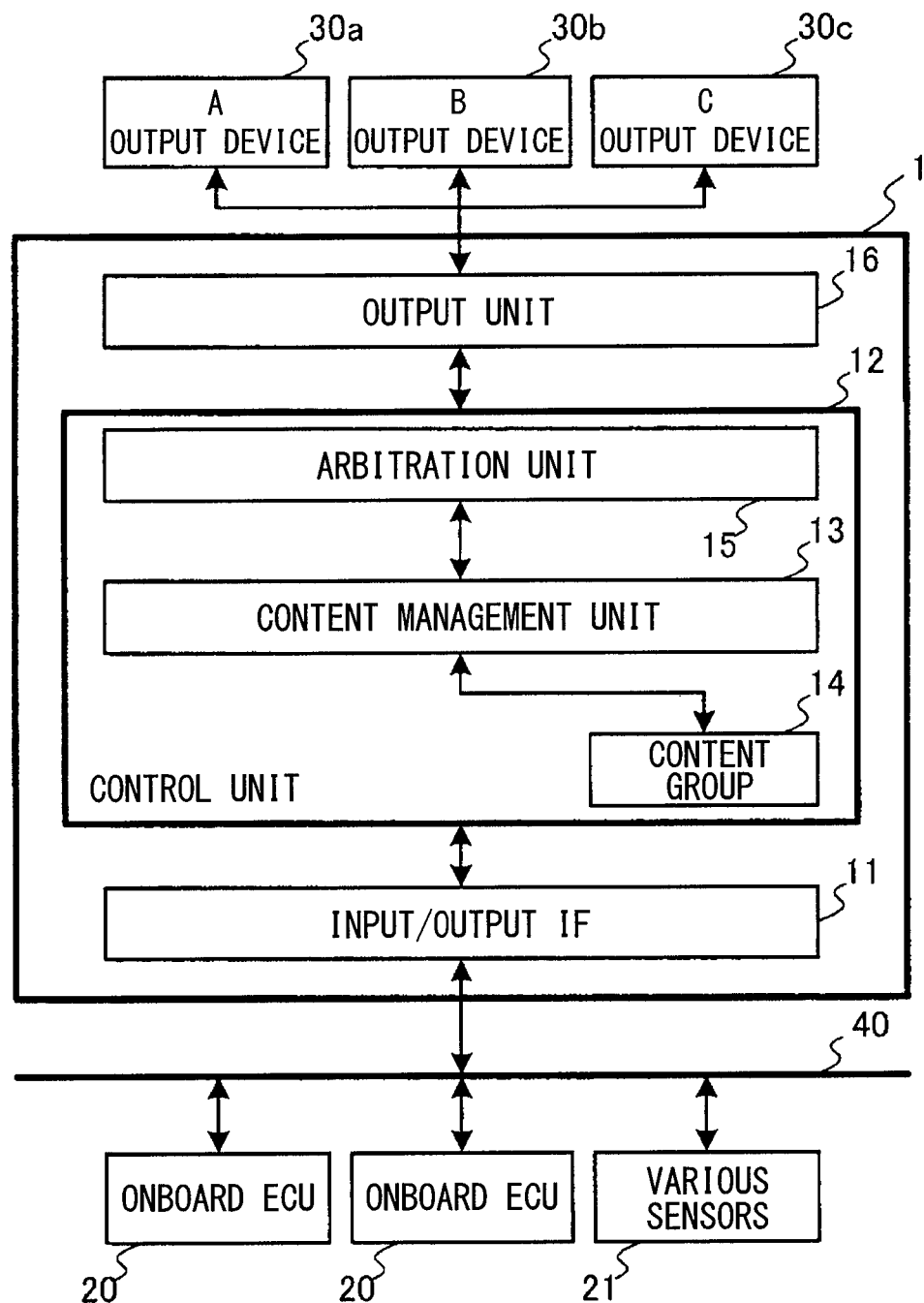
FIG. 1 is a block diagram illustrating a schematic configuration of an audio output control device.

As illustrated in FIG. 1, an audio output control device 1 is connected to vehicle-mounted devices such as output devices 30a, 30b, 30c which are audio output devices such as speakers disposed at various places in a vehicle interior, multiple onboard ECUs 20, and various sensors 21 to configure a vehicle audio output system. The audio output control device 1 is a vehicle-mounted device that outputs audio information according to an audio output request by applications that operate with the aid of the onboard ECUs 20.

The onboard ECUs 20 are multiple electronic control devices that execute the applications for realizing various vehicle functions. In this embodiment, the functions provided by the applications of the onboard ECUs 20 are exemplified by route guidance by voice in conjunction with a navigation system, fee guidance by voice in conjunction with an ETC (registered trademark, electronic toll collection system), and various information provision such as weather information or road information by voice.

When an audio output event where the audio information is output is generated, the application executed by those onboard ECUs 20 notifies the audio output control device 1 of an audio output request for requesting the output of the audio information on the generated audio output event. The audio output is scheduled or adjusted in the audio output control device 1 in response to the audio output request notified by the application, and the audio information on the audio output event is output through the output devices 30a and 30b.

The audio output control device 1 is an information processing device that mainly includes a CPU, a memory and the like not shown. The audio output control device 1 includes, as a functional configuration, an input/output interface 11, a control unit 12, and an output unit 16. The input/output interface 11 is a communication interface unit that transmits and receives information with respect to the onboard ECUs 20 through an onboard network 40. The information transmitted to the audio output control device 1 from the onboard ECUs 20 is input to the control unit 12 through the input/output interface 11. The control unit 12 includes a content management unit 13, a content group 14 stored in a memory, and an arbitration unit 15. In arbitrating the audio outputs responsive to the multiple audio output requests, the content management unit 13 acquires content corresponding to audio output requests output from the applications, and supplies the acquired content to the arbitration unit 15.

Now, the contents corresponding to the audio output requests will be described. In this embodiment, as complementary information associated with the audio output requests, the content illustrated in FIG. 2A is defined. The arbitration unit 15 arbitrates the audio outputs on the basis of the content associated with the respective audio output requests. As illustrated in FIG. 2A, the content includes information such as a delayable period, a content length, a significant information end time, an interruptible time, a life, a category, and an active state.

The delayable period is information indicative of a delay tolerance time from a time when an audio output event is generated in the application to the execution of the output of the audio information. The delayable period is set to be shorter for the audio information high in urgency which is required to be presented to the user promptly. The delayable period is set to be longer for the audio information low in urgency.

The content length is information indicative of a time required to output the audio information to the end. The significant information end time is information indicative of an estimated time at which the significant content has been transmitted for the audio information that is being output. The significant information end time can be calculated, for example, as a time obtained by adding the content length to the output start time of the audio information. Alternatively, when the wording of the sentence end including no significant content in the audio information can be omitted, the significant information end time can be set to be shorter than the content length. Specifically, a time until "ahead, right direction" is output for the audio information of "ahead, right direction" can be set as the significant information end time.

The interruptible time is information indicative of time at which there is semantically punctuation such as a separator of a clause in the audio information being output. The life is information indicative of an expiration time until which the transmission of the audio information has to be finished from the time when the audio output event is generated in the application. The life may be configured by a time set in advance in the system of the audio output control device 1, or may be designated on the application side that issues the audio output request. For example, when there is no designation from the application that issues the audio output request, the life is set as delayable period+content length. Alternatively, the life can be configured by designating a specific period such as the generation time of the audio output event+1 hour (to be output within 1 hour), from the application that issues the audio output request.

The category is information that defines the type of audio information. The category is classified into, for example, a safety notice, a failure notice, a route guidance, a fee guidance and entertainment information by purposes and content of the audio information. As illustrated in FIG. 2B, a value (priority) of the audio information is defined for each category of the content. In this embodiment, it is assumed that a table that defines the value for each of the categories of the content is stored in a memory of the audio output control device 1 in advance. The active state is information indicating that the audio output request related to the content is valid.

Returning to FIG. 1, a description will be made. The content group 14 includes information necessary for the content management unit 13 to acquire the content related to the audio output request such as a template of the content or the detail of the content used for general purposes. The content management unit 13 acquires the content related to the audio information from the application of an audio output request source on the basis of the information included in the content group 14. The arbitration unit 15 performs arbitration such as schedule adjustment of the audio outputs taking a concept of the time provided by the content and the value of the audio information into account. The detailed description of a process to be executed by the arbitration unit 15 will be described later. The output unit 16 is an audio output interface unit that outputs an audio output signal based on the audio information output as a result of the arbitration by the arbitration unit 15 to the predetermined output devices 30a and 30b, and outputs voice.

[Description of Main Process to be Executed by Audio Output Control Device 1]

Figure 3:
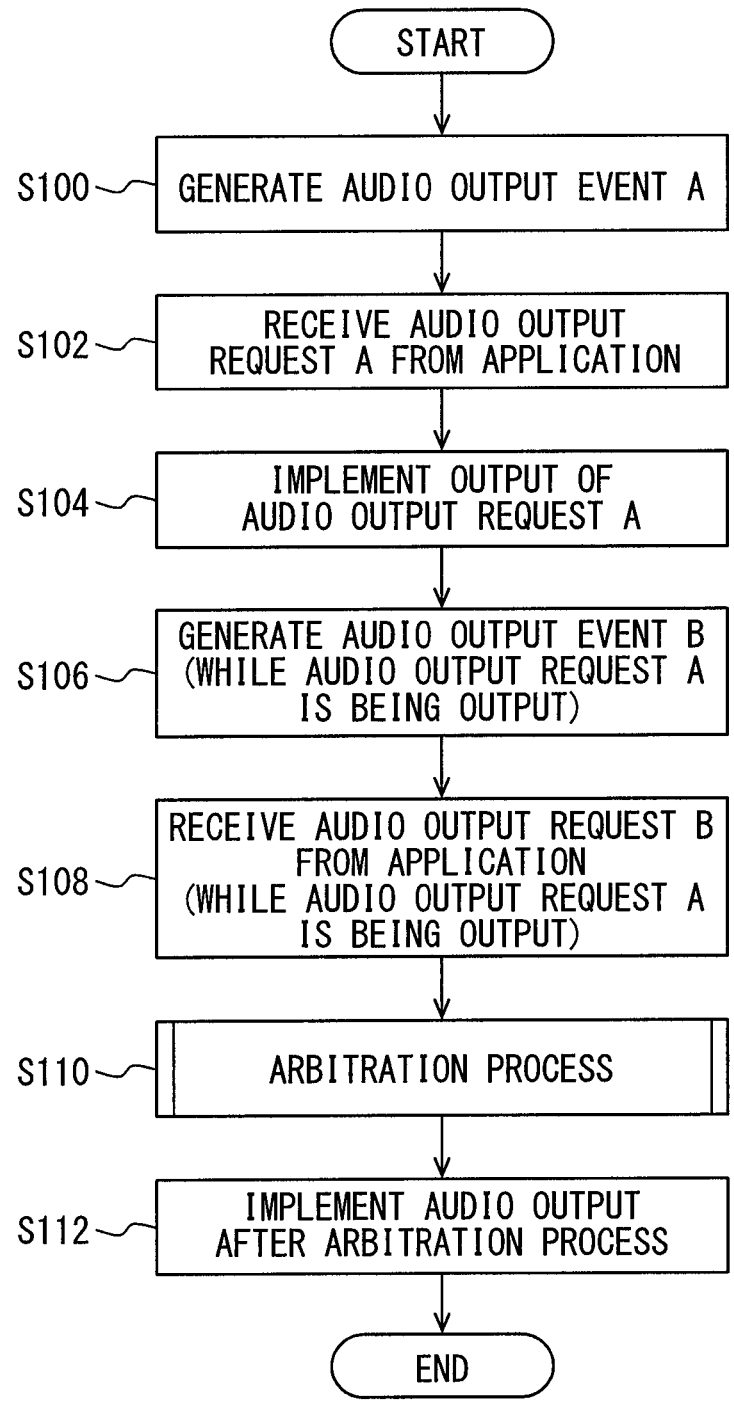
FIG. 3 is a flowchart illustrating a procedure of a main process to be executed by a control unit.

A procedure of a main process to be executed by the control unit 12 of the audio output control device 1 will be described with reference to a flowchart in FIG. 3. The main process is a process to be executed when the audio output event is generated in the application to be executed by the onboard ECUs 20.

First, it is assumed that an audio output event A is generated in the application to be executed by a certain onboard ECU 20 (S100). In S102, the control unit 12 receives an audio output request A for outputting the audio information related to the audio output event A from the application of a request source through the input/output interface 11. In subsequent S104, the control unit 12 starts the output of the audio information related to the audio output request A through the output unit 16 under a condition where the output of the audio information based on another audio output request is not performed.

In this situation, it is assumed that another audio output event B is generated in the application to be executed by a certain onboard ECU 20 while the audio information related to the audio output request A is being output (S106). In S108, the control unit 12 receives an audio output request B for outputting the audio information related to the audio output event B from the application of the request source through the input/output interface 11.

In subsequent S110, the control unit 12 executes an arbitration process by the arbitration unit 15 on the earlier audio output request A and the later audio output request B. The detailed procedure of the arbitration process will be described later. In S112, the control unit 12 implements the audio outputs on the basis of a result of the arbitration process. In this example, the control unit 12 first outputs the audio information set as an output candidate through the output unit 16. After the output of the audio information set as the output candidate has been completed, if there is the audio information stored in an output waiting buffer, the control unit 12 outputs the audio information through the output unit 16. After the audio information has been output, the control unit 12 ends this process.

[Description of Arbitration Process to be Executed by Arbitration Unit 15]

Figure 4:
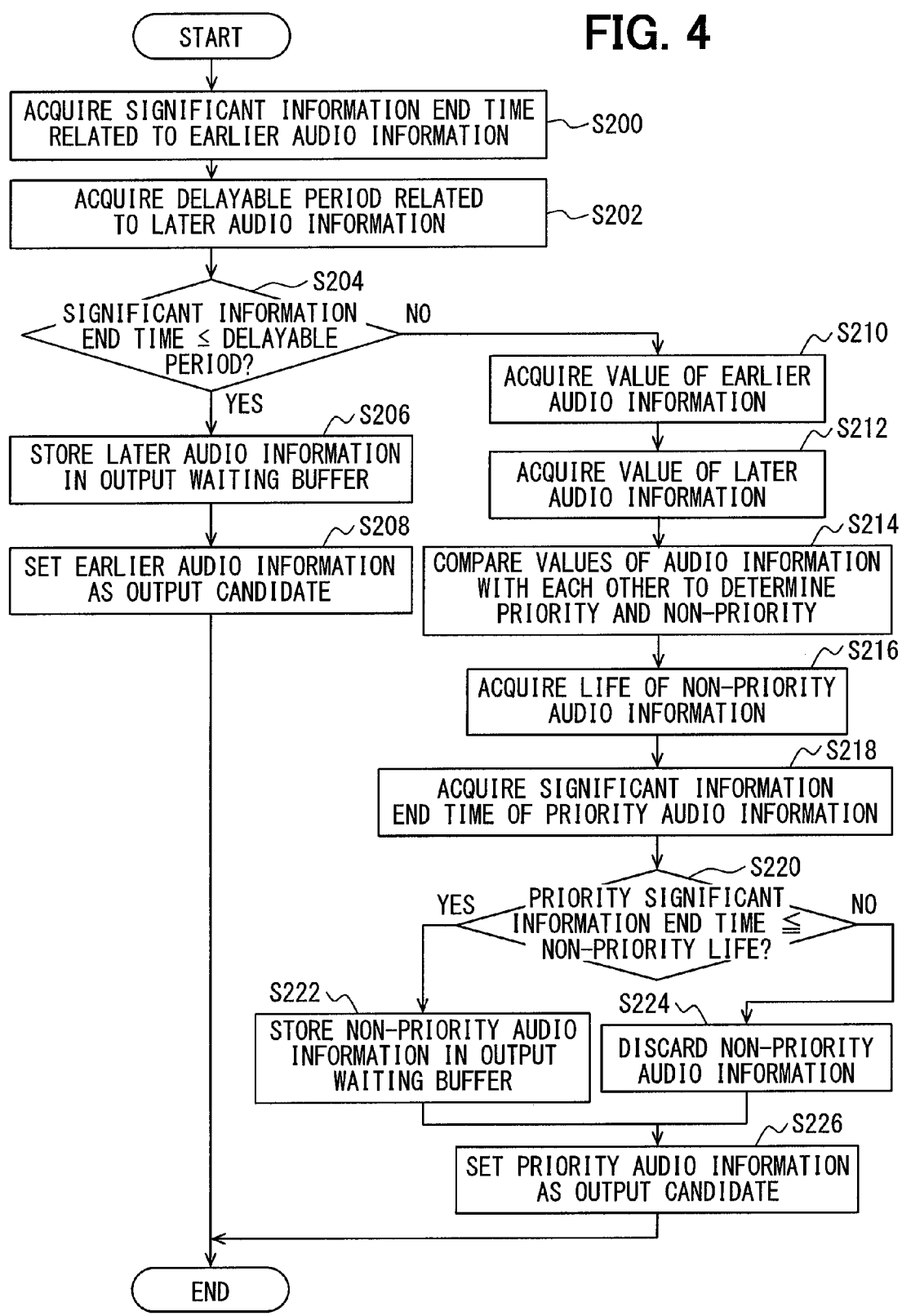
FIG. 4 is a flowchart illustrating a procedure of an arbitration process to be executed by an arbitration unit.

A procedure of the arbitration process to be executed by the arbitration unit 15 of the control unit 12 will be described with reference to a flowchart of FIG. 4. This process is a process to be executed in S110 of the main process described above (refer to FIG. 3).

In S200, the arbitration unit 15 acquires the significant information end time of the earlier audio information from the content related to the earlier audio output request A acquired by the content management unit 13. In S202, the arbitration unit 15 acquires the delayable period of the later audio information from the content related to the later audio output request B acquired by the content management unit 13.

In S204, the arbitration unit 15 compares the significant information end time of the earlier audio information with the delayable period of the later audio information, and branches the process according to the context of the time. In this example, when the significant information end time of the earlier audio information is before the delayable period of the later audio information (yes in S204), the arbitration unit 15 proceeds to S206. On the other hand, when the significant information end time of the earlier audio information is after the delayable period of the later audio information (no in S204), the arbitration unit 15 proceeds to S210.

In S206 to which the arbitration unit 15 proceeds when the significant information end time of the earlier audio information is before the delayable period of the later audio information, the arbitration unit 15 stores output data of the later audio information to the output waiting buffer provided in a predetermined region of the memory. The output waiting buffer is a memory region for temporarily storing the audio information to be output later in order to wait until the output of the audio information to be output preferentially is completed. In subsequent S208, the arbitration unit 15 sets the output data of the earlier audio information as an output candidate, and ends this process.

In S210 to which the arbitration unit 15 proceeds when the significant information end time of the earlier audio information is after the delayable period of the later audio information, the arbitration unit 15 acquires the value of the earlier audio information. In S212, the arbitration unit 15 also acquires the value of the later audio information. In this example, the arbitration unit 15 acquires the value (priority) of the audio information defined in each of the categories from the table stored in the memory in advance on the basis of the category of the content related to each of the audio output requests.

Then, in S214, the arbitration unit 15 compares the value of the earlier audio information with the later audio information, and determines the audio information higher in the value as "priority", and the audio information lower in the value as "non-priority". When the value of the earlier audio information is equal to that of the later audio information, the arbitration unit 15 determines the earlier audio information as "priority", and the later audio information as "non-priority". In subsequent S216, the arbitration unit 15 acquires the life of the non-priority audio information from the content related to the non-priority audio information. In S218, the arbitration unit 15 acquires the significant information end time of the priority audio information from the content related to the priority audio information.

Then, in S220, the arbitration unit 15 compares the significant information end time of the priority audio information with the life of the non-priority audio information, and branches the process according to the time context. In this example, when the significant information end time of the priority audio information is before the life of the non-priority audio information (yes in S220), the arbitration unit 15 proceeds to S222. On the other hand, when the significant information end time of the priority audio information is after the life of the non-priority audio information (no in S220), the arbitration unit 15 proceeds to S224.

In S222 to which the arbitration unit 15 proceeds when the significant information end time of the priority audio information is before the life of the non-priority audio information, the arbitration unit 15 stores the output data of the non-priority audio information in the output waiting buffer. On the other hand, in S224 to which the arbitration unit 15 proceeds when the significant information end time of the priority audio information is after the life of the non-priority audio information, the arbitration unit 15 discards the output data of the non-priority audio information. In subsequent S226, the arbitration unit 15 sets the output data of the priority audio information as the output candidate, and ends this process.

[Specific Execution Example 1 of Arbitration Process]

A specific execution example 1 of the arbitration process described above (refer to FIG. 4) will be described with reference to FIGS. 5A to 5B. This example assumes a case in which two audio output requests of the audio information A of the content that "after going about 300 m, turn right" in the route guide, and the audio information B of the content that "the fee is 3200 yen" in the fee guidance coincide with each other.

Figure 5:
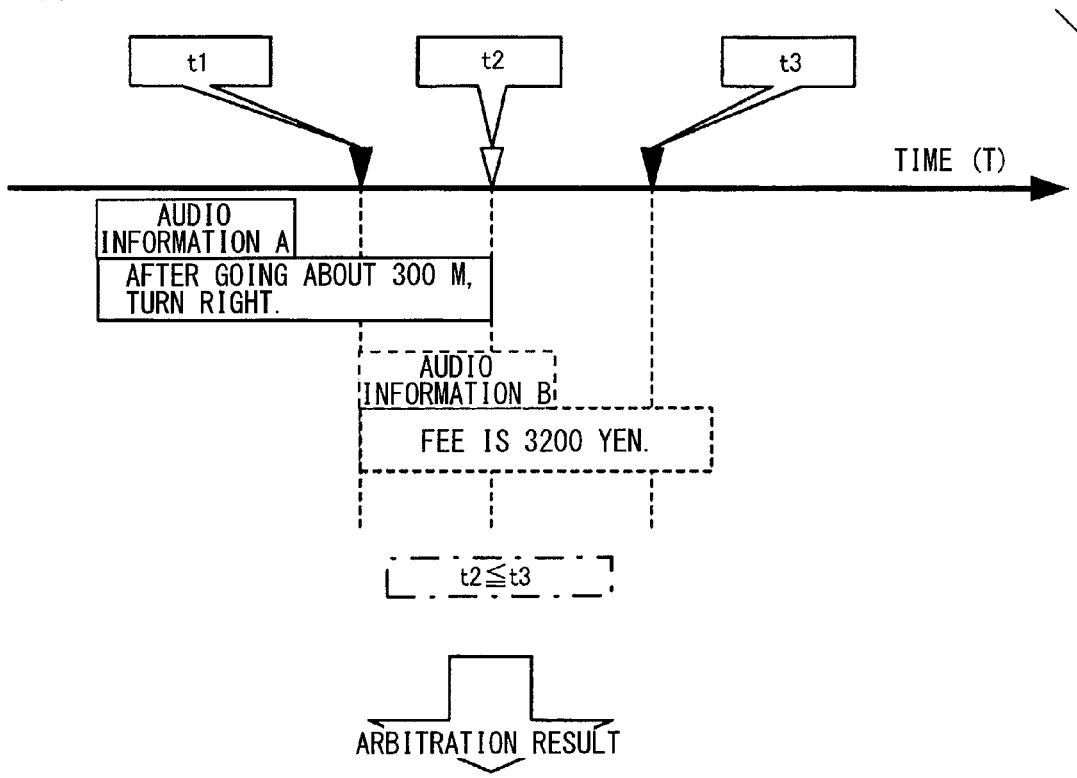
FIG. 5 is an illustrative view illustrating a specific execution example 1 of the arbitration process.
Figure 5:
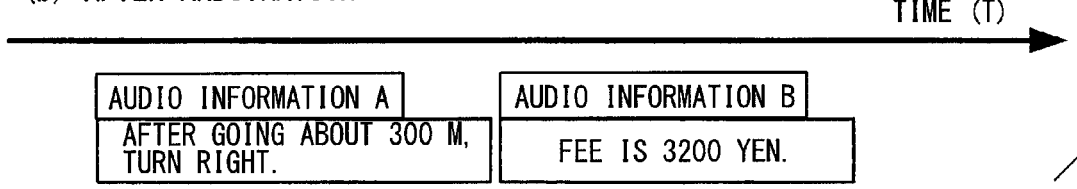

As exemplified in FIG. 5A, the output of the audio information A first starts as earlier audio information. In this case, it is assumed that the significant information end time indicated by the content related to the audio information A is t2. On the other hand, it is assumed that the audio output event related to the audio information B is generated at a time t1 when the audio information A is being output. In this situation, it is assumed that the delayable period indicated by the content related to the audio information B is t3.

In the case of FIG. 5A, the delayable period t3 of the later audio information B is later than the significant information end time t2 of the earlier audio information A. In this case, as exemplified by FIG. 5B, the output of the later audio information B waits temporarily, and the output of the audio information B is implemented after the output of the audio information A has ended.

[Specific Execution Example 2 of Arbitration Process]

A specific execution example 2 of the arbitration process described above (refer to FIG. 4) will be described with reference to FIGS. 6A to 6C. This example assumes a case in which two audio output requests of the audio information A of the content that "after going about 300 m, turn right" in the route guide, and the audio information B of the content that "the fee is 3200 yen" in the fee guidance coincide with each other.

Figure 6:
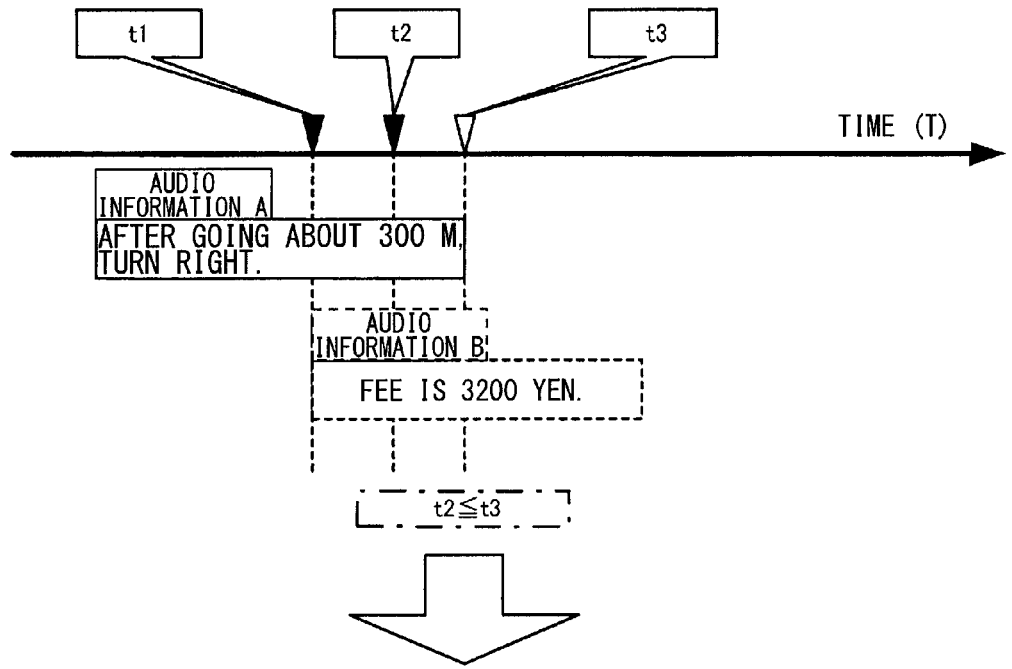
FIG. 6 is an illustrative view illustrating a specific execution example 2 of the arbitration process.
Figure 6:
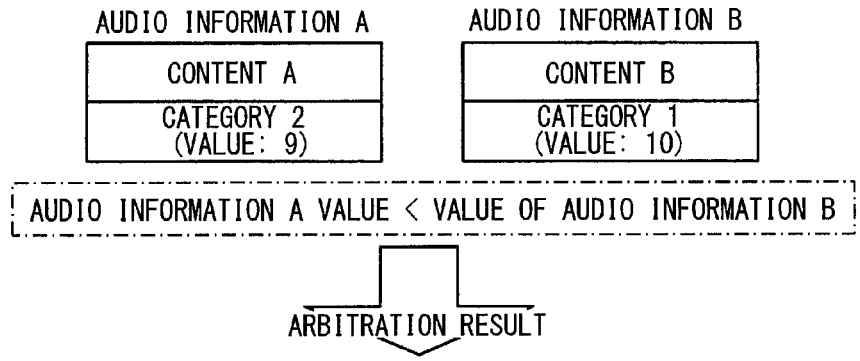
Figure 6:
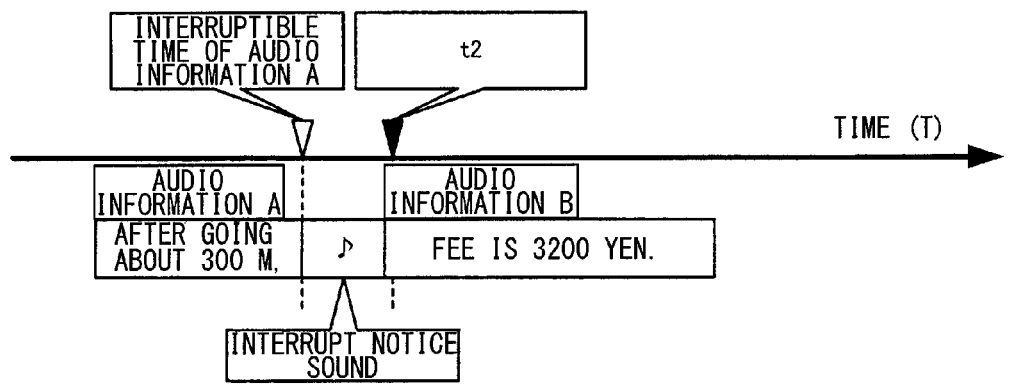

As exemplified in FIG. 6A, the output of the audio information A first starts as earlier audio information. In this case, it is assumed that the significant information end time indicated by the content related to the audio information A is t3. On the other hand, it is assumed that the audio output event related to the audio information B is generated at a time t1 when the audio information A is being output. In this situation, it is assumed that the delayable period indicated by the content related to the audio information B is t2.

In the case of FIG. 6A, the delayable period t2 of the later audio information B is earlier than the significant information end time t3 of the earlier audio information A. In that case, as exemplified in FIG. 6B, the value corresponding to the category indicated by the content related to the audio information A is compared with the value corresponding to the category indicated by the content related to the audio information B. This example assumes a case in which a value (10) of the later audio information B is larger than a value (9) of the earlier audio information A.

As a result of arbitration based on the values of the audio information, the earlier audio information A becomes non-priority, and the later audio information B becomes priority. In this case, as exemplified in FIG. 6C, the output of the audio information A of non-priority is interrupted, and the audio information B of priority is output by interrupt. Timing at which the output of the audio information A is interrupted may be preferably set to the interruptible time indicated by the content related to the audio information A. With the above configuration, the uncomfortable feeling undergone by the user when the audio information A is interrupted can be reduced.

At the time of starting the audio output by interrupt, an interrupt notice sound may be output immediately before the audio information. With the above configuration, the uncomfortable feeling undergone by the user can be reduced by the interrupt of the audio information. When the interrupt notice sound is output, a condition of "the interruptible time of audio information A (non-priority)+content length of the interrupt notice sound<the delayable period of the audio information B (priority)" is met. It is assumed that the content length of the interrupt notice sound is defined in the system of the audio output control device 1 in advance.

[Specific Execution Example 3 of Arbitration Process]

A specific execution example 3 of the arbitration process described above (refer to FIG. 4) will be described with reference to FIGS. 7A to 7B. This example assumes a case in which two audio output requests of the audio information A of the content that "Δ day, ○ a month, this is weather forecast for today. It will be sunny throughout the country." in the weather guidance, and the audio information B of the content that "the fee is 3200 yen" in the fee guidance coincide with each other.

Figure 7:
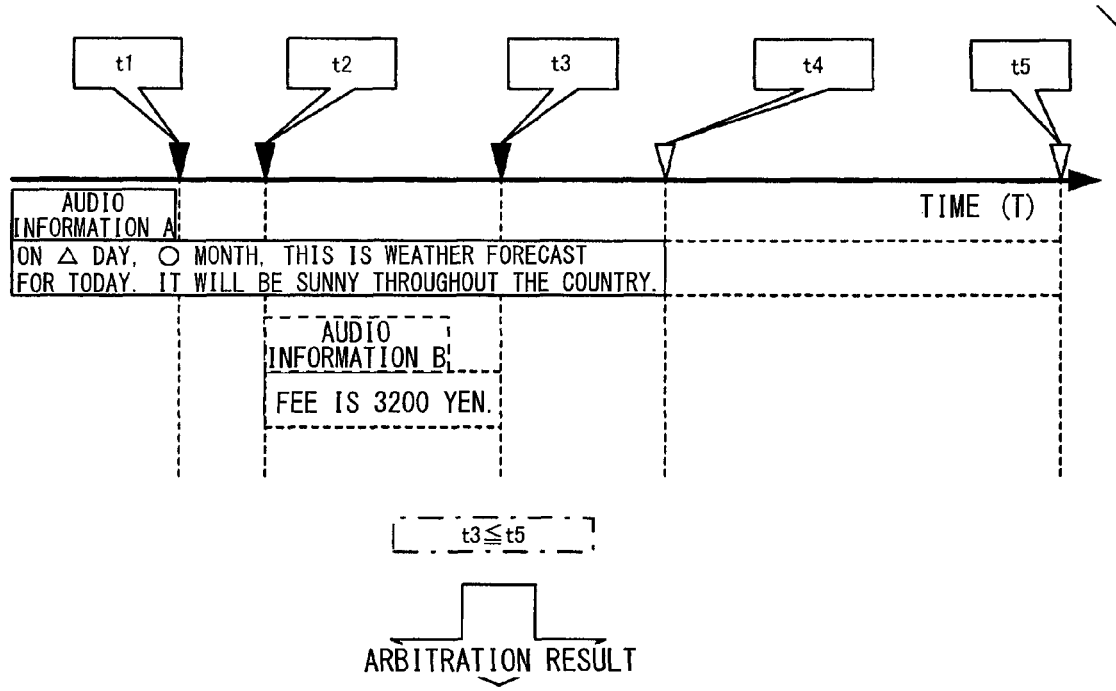
FIG. 7 is an illustrative view illustrating a specific execution example 3 of the arbitration process.
Figure 7:
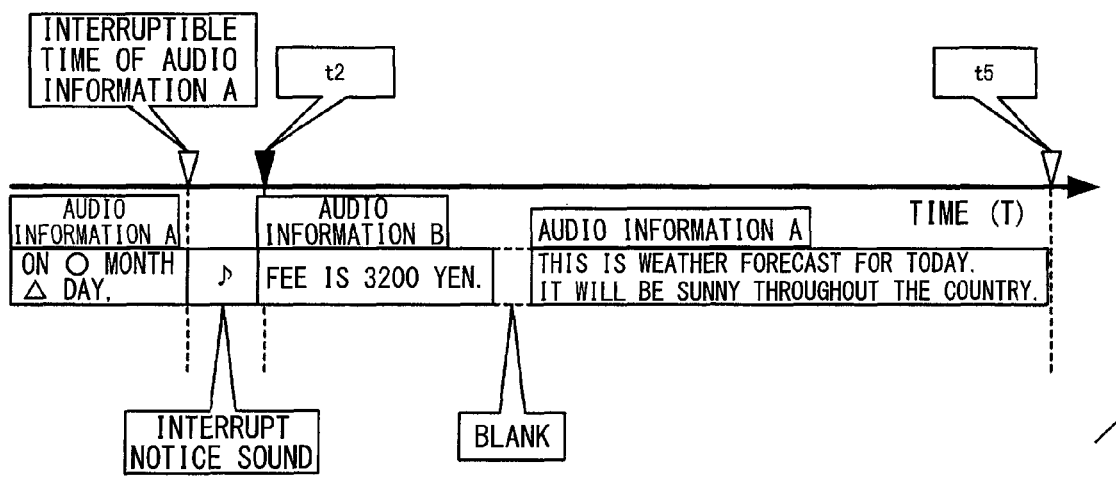

As exemplified in FIG. 7A, the output of the audio information A first starts as earlier audio information. In this case, it is assumed that the significant information end time indicated by the content related to the audio information A is t4. On the other hand, it is assumed that the audio output event related to the audio information B is generated at a time t1 when the audio information A is being output. In this situation, it is assumed that the delayable period indicated by the content related to the audio information B is t2.

In the case of FIG. 7A, the delayable period t2 of the later audio information B is earlier than the significant information end time t4 of the earlier audio information A. In that case, arbitration is performed by comparison of the value corresponding to the category indicated by the content related to the audio information A with the value corresponding to the category indicated by the content related to the audio information B. A description will be made assuming that the value of the later audio information B is larger than the value of the earlier audio information A.

As a result of arbitration based on the values of the audio information, the earlier audio information A becomes non-priority, and the later audio information B becomes priority. Further, the significant information end time t3 of the priority audio information B is compared with the life indicated by the content related to the non-priority audio information A to determine whether to enable a wait for the non-priority audio information A, or not. It is assumed that the significant information end time t3 of the later audio information B is the delayable period t2 of the audio information B+content length. As a result of the comparison, the non-priority audio information A is stored in the output waiting buffer under a condition where "the significant information end time t3 of the audio information B (priority) ≤the life t5 of audio information A (non-priority)".

As a result of the arbitration, as exemplified in FIG. 7B, the output of the audio information A of non-priority is interrupted, and the audio information B of priority is output by interrupt. It is assumed that timing at which the output of the audio information A is interrupted is the interruptible time indicated by the content related to the audio information A. At the time of starting the audio output by interrupt, an interrupt notice sound is output before the audio information. Then, after the output of the priority audio information B has been completed, the output of the non-priority audio information A stored in the output waiting buffer restarts. In restarting the output of the audio information A, the output of the audio information A starts from continuation of an interrupted place at the interruptible time.

When the output of the audio information which waits for the audio outputs by interrupt restarts, a silent blank period may be put immediately before restart. With this arrangement, the uncomfortable feeling undergone by the user by switching the audio output to another can be reduced. When the blank period is put, a condition where "life of audio information A (non-priority)>the significant information end time of audio information B (priority)+the content length of the blank period" is met. It is assumed that the content length of the blank period is defined in the system of the audio output control device 1 in advance.

(Advantageous Effects)

The audio output control device 1 according to the above embodiment obtains the following advantages.

The multiple audio outputs can be arbitrated taking the temporal characteristics of the audio information such as the significant information end time and the delayable period indicated by the content related to the audio output request into account. Specifically, if the output of the later audio information can be respited until the significant content of the earlier audio information has been transmitted, the output of the later audio information can wait without interrupting the output of the earlier audio information. As described above, the temporal characteristics not taken into consideration in the prior art are employed for arbitration of the audio outputs. As a result, as compared with a case in which the arbitration is performed by only the definition of the priority, the schedule of the outputs of the audio information can be adjusted in a more flexible mode.

As a result of the arbitration based on the comparison of the significant information end time related to the earlier audio information with the delayable period related to the later audio information, if it is determined that the output of the later audio information cannot wait, the arbitration of the audio outputs can be performed on the basis of the values of the respective audio information. With the above configuration, the schedule of the outputs of the audio information can be adjusted in a mode where both of the temporal characteristics of the audio information and the information value of the audio information are taken into consideration.

Incidentally, as a result of the arbitration of the audio outputs based on the values of the audio information, there is a need to determine whether the non-priority audio output request negatively arbitrated is buffered, or discarded. In order to realize the above-mentioned determination in the prior art, there is a need to define solution to the negative arbitration in an arbitration table, individually. For that reason, an effort is required for development of the arbitration table. On the contrary, in this embodiment, the significant information end time of the priority audio information is compared with the life (expiration time) indicated by the content related to the non-priority audio information. This makes it possible to determine whether the non-priority audio information is stored in the output waiting buffer, and waits, or is discarded. As a result, it can be determined whether the non-priority audio information is buffered or discarded on the basis of the temporal characteristics of the audio information without any effort to define the solution related to the non-priority audio information negatively arbitrated in the arbitration table in advance.

When the later audio information is output by interrupt while the earlier audio information is being output, the output of the earlier audio information is interrupted at the interruptible time indicated by the content related to the earlier audio information, and the later audio information can be output. In restarting the interrupted audio output, the continuation of the audio information can be output from the interrupted place at the interruptible time described above. With the application of the above mechanism, the position at which the audio output is interrupted can be set to a position at which there is semantically punctuation such as a separator of a clause in the audio information. This makes it possible to reduce the uncomfortable feeling undergone by the user when the output of the earlier audio information is interrupted.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An audio output control device that outputs audio information from an audio output device according to an output request output from each of a plurality of output request devices for requesting an output of the audio information, the audio control device comprising:
 a control device that adjusts an output of earlier audio information and an output of later audio information in a situation where a request for outputting the later audio information is made before the output of the earlier audio information ends,
 wherein the control device includes:
  a first acquisition device that acquires end time information related to an estimated time of the output of the earlier audio information, at which transmission of a significant content of the earlier audio information is completed;
a second acquisition device that acquires delay permissible information related to a permissible time of a delay from time when the request for outputting the later audio information is made until the output of the later audio information starts; and
a first determination device that determines whether a wait for outputting the later audio information is available, according to a temporal relationship between the end time information acquired by the first acquisition device and the delay permissible information acquired by the second acquisition device, and wherein the control device waits for outputting the later audio information, and outputs the later audio information after preferentially executing the output of the earlier audio information, under a condition that it is determined that the wait by the first determination device is available.

2. The audio output control device according to claim 1, wherein the control device further includes a comparison device that compares an information value preliminary defined in the earlier audio information with an information value preliminary defined in the later audio information, and wherein the control device outputs the audio information having a higher information value preferentially based on a comparison result of the comparison device under a condition that it is determined that the wait by the first determination device is not available.

3. The audio output control device according to claim 2, wherein the control device further includes:
a third acquisition device that acquires end time information related to an estimated time of an output of high priority audio information, at which transmission of the significant content of the high priority audio information that is determined to have the higher information value based on the comparison result of the comparison device is competed;
a fourth acquisition device that acquires expiration time information related to an expiration time of an output of low priority audio information that is determined to have lower information value based on the comparison result of the comparison device; and
a second determination device that determines whether a wait for outputting the low priority audio information is available, according to a temporal relationship between the end time information acquired by the third acquisition device and the expiration time information acquired by the fourth acquisition device, wherein, when it is determined that the wait by the second determination device is available, the control device waits for outputting the low priority audio information, and executes the output of the low priority audio information after outputting the high priority audio information, and wherein, when it is determined that the wait by the second determination device is not available, the control device abandons the output of the low priority audio information.

4. The audio output control device according to claim 2, wherein, when the control device outputs the later audio information by interruption while the earlier audio information is being output as a result of adjusting the output of the earlier audio information and the output of the later audio information, the control device interrupts the output of the earlier audio information at a predetermined interruption enable position, and outputs the later audio information.

* * * * *